United States Patent
Kibi et al.

[11] Patent Number: 5,973,912
[45] Date of Patent: *Oct. 26, 1999

[54] POLARIZABLE ELECTRODE

[75] Inventors: Yukari Kibi; Takashi Saito; Atsushi Ochi, all of Tokyo, Japan

[73] Assignee: NEC Corporation, Tokyo, Japan

[*] Notice: This patent is subject to a terminal disclaimer.

[21] Appl. No.: 08/360,212

[22] Filed: Dec. 20, 1994

[30] Foreign Application Priority Data

Dec. 28, 1993 [JP] Japan .................................. 5-333994

[51] Int. Cl.⁶ ..................................................... H01G 9/00
[52] U.S. Cl. ............................ 361/502; 361/305; 361/303
[58] Field of Search ...................... 361/303, 304, 361/305, 306.1, 311, 502; 29/25.03, 25.41, 25.42

[56] References Cited

U.S. PATENT DOCUMENTS

| | | |
|---|---|---|
| 4,717,595 | 1/1988 | Watanabe et al. |
| 5,172,307 | 12/1992 | Tabuchi et al. |
| 5,446,005 | 8/1995 | Endo |

FOREIGN PATENT DOCUMENTS

| | | |
|---|---|---|
| 4-44407 | 8/1985 | Japan |
| 63-226019 | 3/1987 | Japan |
| 4-288361 | 3/1991 | Japan |

OTHER PUBLICATIONS

180th Electrochemical Society Fall Meeting, Phoenix, AZ, Oct. 13–17, 1991, vol. 91–2, No. 80, p. 121.

Proceedings of the 41st Electronic Components and Technology Conference, 1991, pp. 531–536.

NEC Technical Disclosure, vol. 46, No. 10, 1993.

*Primary Examiner*—Leo P. Picard
*Assistant Examiner*—Phuong T. Vu
*Attorney, Agent, or Firm*—Laff, Whitesel & Saret, Ltd.

[57] ABSTRACT

The invention provides a polarizable electrode composed of activated carbon/carbon composite having micropores among which micropores having a diameter ranging from 0.1 to 5.0 micrometers have a volume ranging from 0.1 to 1.2 cm³/g. The composite further has a specific surface area equal to or greater than 1000 m²/g, and a density equal to or greater than 0.5 g/cm³. The micropores having a diameter of micrometers order to be formed in the polarizable electrode in accordance with the invention, facilitate the movement of ions in the electrode. Thus, it is possible to accomplish a polarizable electrode suitable for a larger amount of current discharge.

5 Claims, 1 Drawing Sheet

POLARIZABLE ELECTRODE

BACKGROUND OF THE INVENTION

1. Field of the Invention

The invention relates to a polarizable electrode for use with a device such as an electric double layer capacitor and a cell.

2. Description of the Related Art

An electric double layer capacitor (EDLC) has been widely used as memory back-up devices. In such devices, the electric double layer capacitor is electrically connected in parallel with a cell or a DC battery converted from a commercially available AC battery, and carries out back-up for the devices by electric charges stored in the capacitor when the cell or battery is instantaneously cut off.

A large-capacitance electric double layer capacitor having a capacitance larger than 10 farads has been recently developed. For instance, there is reported an electric double layer capacitor having 500 farads capacitance at 2.3 V working voltage in Proceeding of the 41st Electronic Components and Technology Conference, 1991, pages 531–536. For another example, there is reported an electric double layer capacitor having 1000 farads capacitance at 5.5 V working voltage in Extended Abstract of the 180th Electrochemical Society Fall Meeting, Phoenix Ariz., Oct. 13–17, 1991, Vol. 91–2, No. 80, page 121. These electric double layer capacitors are expected to be applied to pulse power accumulator for use, for instance, with an electric automobile by making the best use of properties thereof that such capacitors have a large-capacitance and a low equivalent series resistance (ESR).

There are used several solid activated carbons as a polarizable electrode for use with the above mentioned large-capacitance electric double layer capacitor. For instance, Japanese Patent Publication No. 4-44407 has suggested a polarizable electrode manufactured by carbonizing and activating phenol resin, polyvinyl alcohol, starch and phenol resin foam obtained from formalin and acid catalyst. Japanese Unexamined Patent Public Disclosure No. 63-226019 has suggested a polarizable electrode manufactured by thermally treating a mixture of activated carbon fiber or powder and resol type phenol resin. Japanese Unexamined Patent Public Disclosure No. 4-288361 has disclosed solid activated carbon manufactured by thermally treating a mixture of activated carbon powder and phenol resin powder.

A large-capacitance electric double layer capacitor is required to be able to supply a lot of current in a moment in order to work as a pulse power accumulator. The polarizable electrode suggested in Japanese Unexamined Patent Public Disclosure No. 4-288361 has micropores including those of activated carbon powder having a radius in the range ten to tens of angstroms, and those which are formed when phenol resin is carbonized and have a radius in the range from 1000 to 2000 angstroms. in such a polarizable electrode having a micro-porous structure, movement of ions in micropores is suppressed. Thus, the above mentioned polarizable electrode poses a problem that if a lot of current is to be discharged, a capacitance thereof is apparently decreased, and hence the sufficient performance cannot be obtained, as reported in NEC Technical Disclosure, Vol. 46, No. 10, 1993, FIG. 10. It is considered that the polarizable electrode suggested in Japanese Unexamined Patent Public Disclosure No. 63-229019 has a similar problem. Thus, it is required to realize a micro-porous structure in which ions can move more easily.

In addition, a maximum current passing through a unit volume of a polarizable electrode is in proportion to a capacitance per a unit volume of the electrode. Thus, it is preferable for a polarizable electrode to have a larger capacitance per a unit volume.

Japanese Unexamined Patent Public Disclosure No. 4-44407 has also suggested a method for manufacturing a polarizable electrode having micropores having a diameter of a few micrometers. In the method, after phenol resin foam has been molded, the molded foam is carbonized and activated. However, a porous electrode obtained by the method has a tow density and a quite small capacitance per a unit volume. In addition, the method has complex steps, and hence the method is considered to need high cost. Furthermore, since the resin is foam is to be carbonized and activated in the method, there can be obtained only a small yield, and further it is quite difficult to uniformly process the resin foam. In addition, the method uses natural products such as starch as a raw material. Such natural products contain impurities such as Na and K, and hence are not suitable for a raw material for manufacturing a polarizable electrode.

The methods for manufacturing powder or fibrous raw material as suggested in Japanese Unexamined Patent Public Disclosures Nos. 63-226019 and 4-288361 pose a problem that powder scatters during manufacturing a polarizable electrode.

SUMMARY OF THE INVENTION

In view of the foregoing problems of the conventional methods, it is an object of the present invention to provide a polarizable electrode having therein micropores having a diameter of micrometer orders for facilitating the movement of ions therein to thereby be suitable for supplying a large amount of current.

The invention provides a polarizable electrode composed of activated carbon/carbon composite having micropores among which micropores having a diameter ranging from 0.1 to 5.0 micrometers have a volume ranging from 0.1 to 1.2 $cm^3$/g, the composite further having a specific surface area equal to or greater than 1000 $m^2$/g and a density equal to or greater than 0.5 $g/cm^3$.

In a preferred embodiment, activated carbon powder of which the activated carbon/carbon composite is to be manufactured has a specific surface area equal to or greater than 1600 $m^2$/g.

In another preferred embodiment, activated carbon powder of which the activated carbon/carbon composite is to be manufactured has a specific surface area equal to or greater than 2000 $m^2$/g.

In still another preferred embodiment, the activated carbon/carbon composite is composed of a mixture thermally treated in non-oxidizing atmosphere, which mixture comprising activated carbon power having a specific surface area equal to or greater than 1600 $m^2$/g, and heat-fusible and curable phenol resin.

In yet another preferred embodiment, the activated carbon powder has a specific surface area equal to or greater than 2000 $m^2$/g.

In still yet another preferred embodiment, the activated carbon/carbon composite is composed of a mixture thermally treated in non-oxidizing atmosphere, which mixture is prepared by mixing activated carbon power with heat-fusible and curable phenol resin at a temperature in the range from 80 to 120 degrees centigrade.

In further preferred embodiment, the activated carbon/carbon composite is composed of a mixture thermally treated in non-oxidizing atmosphere, which mixture is prepared by mixing activated carbon power, heat-fusible and curable phenol resin with heat-nonfusible phenol resin ranging from 15 to 60 percent by weight on the basis of the weight of the heat-fusible and curable phenol resin.

In further preferred embodiment, the mixing is carried out at a temperature lower than a curing temperature of phenol resin.

In further preferred embodiment, the activated carbon powder has a specific surface area equal to or greater than 1600 m$^2$/g.

In further preferred embodiment, the activated carbon powder has a specific surface area equal to or greater than 2000 m$^2$/g.

In further preferred embodiment, the non-oxidizing atmosphere is a nitrogen atmosphere.

In further preferred embodiment, the mixture is thermally treated in an electric furnace.

In further preferred embodiment, the activated carbon/carbon composite is composed of a mixture thermally treated in non-oxidizing atmosphere, which mixture is composed of particulate mixture of activated carbon powder and heat-fusible and curable phenol resin, the particulate mixture having an average diameter equal to or greater than 500 micrometers and including polyvinyl alcohol as a binder.

The advantages obtained by the aforementioned present invention will be described hereinbelow.

As having been explained, it is preferable for activated carbon powder as a raw material to have a specific surface area equal to or greater than 1600 m$^2$/g. By using such activated carbon, a part of phenol resin is cured by catalytic action of the activated carbon when raw material powders are mixed with each other, and hence there are formed micropores or cavities in the molded and carbonized activated carbon/carbon (AC/C) composite. The micropores facilitate movement of ions. In addition, the thus manufactured AC/C composite has a large specific surface area and a large density, and hence has a large capacitance per unit volume. Thus, it is possible to discharge a larger amount of current than conventional electrodes.

By adding heat-nonfusible phenol resin to raw materials, there are formed micropores or cavities in a compact because the heat-nonfusible phenol resin remains to be in a particulate shape even while being molded. Then, the compact is carbonized with the micropores or cavities remaining as they are. Thus, the micropores in a polarizable electrode facilitate the movement of ions.

In addition, by carrying out molding of a raw material mixture at a temperature lower than a curing temperature of phenol resin, a part of the phenol resin remains not fused, and forms micropores. A compact is carbonized with the micropores remaining as they are. Thus, the micropores in a polarizable electrode facilitate the movement of ions.

As having been explained, polyvinyl alcohol (PVA) may be added to raw material powder. The polyvinyl alcohol works as a binder, and hence the raw material powder makes particles having a diameter greater than 500 micrometers. Thus, a problem of the conventional method that powders scatter during manufacturing steps can be solved. In addition, PVA is decomposed during thermal treatment to thereby form micropores. The micropores facilitate the movement of ions.

Furthermore, the formed micropores shorten a period of time for sintering an electrolytic solution into the AC/C composite.

The above and other objects and advantageous features of the present invention will be made apparent from the following description made with reference to the accompanying drawings, in which like reference characters designate the same or similar parts throughout the drawings.

DESCRIPTION OF HE PREFERRED EMBODIMENTS

Figure 1:
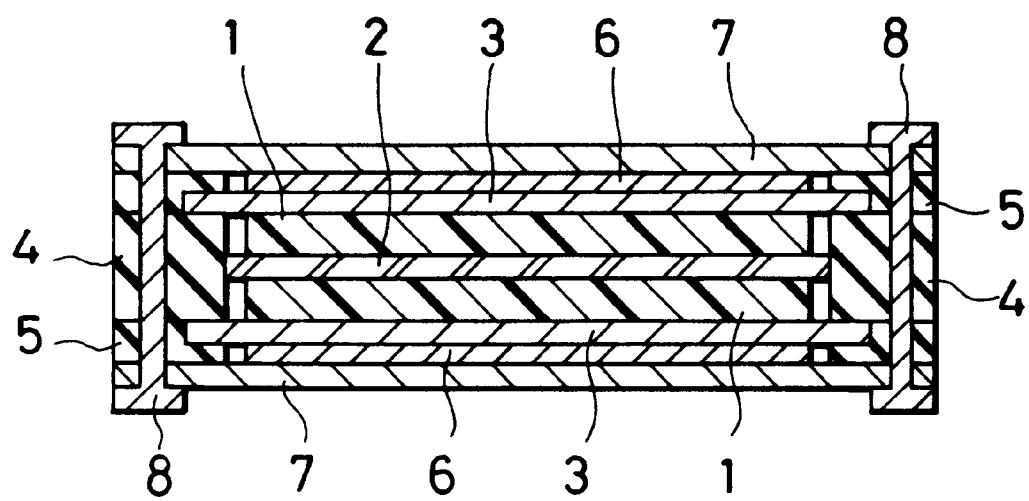
FIG. 1 is a cross-sectional view of an electric double layer capacitor including a polarizable electrode in accordance with the invention.

Preferred embodiments in accordance with the present invention will be explained hereinbelow with reference to drawings.

[Embodiment 1]

First, there was prepared four mixtures each including phenol family activated carbon powder having a specific surface area of 1200, 1600, 2000 and 2400 m$^2$/g, and phenol resin powder commercially available from Kanebo Inc., Ltd. by the tradename of Belipearl S type. A mixture ratio by weight of the former and the latter is 7:3. Each of the mixtures were sufficiently dry mixed with a ball mill. Then, 10 grams of each mixture were molded with a metal mold at 150 degrees centigrade under 100 kg/cm$^2$ for 10 minutes to thereby form phenol resin plates each including activated carbon and having a size of 70×50 mm$^2$ and a thickness of 3 mm. Then, the phenol resin plates were thermally treated at 900 degrees centigrade for 2 hours in an electric furnace under nitrogen ($N_2$) atmosphere. A rate of raising and lowering a temperature was 10 degrees per hour. Then, a volume of micropores of each of the obtained activated carbon/carbon (AC/C) composite was measured with mercury press-in process. A distribution peak of all samples was between 0.1 and 5.0 micrometers. Table 1 shows a volume of micropores having a diameter in the range of 0.1 to 5.0 micrometers, a density and BET specific surface area.

With reference to FIG. 1, hereinbelow will be explained an electric double layer capacitor (ELDC) manufactured from the thus obtained solid activated carbon. FIG. 1 shows a cross-section of an electric double layer capacitor in accordance with an embodiment of the invention. The electric double layer capacitor has a pair of polarizable electrodes 1 composed of the obtained activated carbon/carbon (AC/C) composite. First, each of the polarizable electrodes 1 was immersed in a sulfuric acid solution to be used as an electrolytic solution including sulfuric acid by 30% by weight. Thus, the polarizable electrodes 1 were sintered in vacuum. Taking the pair of the polarizable electrodes 1, which are composed of the same raw material, out of the solution, a separator 2 composed of polypropylene was sandwiched between the pair of the polarizable electrodes 1 so that the polarizable electrodes 1 faced to each other. Then, the pair of the polarizable electrodes 1 were covered with electrically conductive sheets working as a current collector 3. The sheet was composed of butyl rubber. In order to avoid the current collectors 3 from contacting with each other, gaskets 4 composed of polycarbonate were disposed around the polarizable electrodes 1 so that the gaskets 4 were sandwiched between the current collectors 3. Then, a pair of supports 5 composed of polycarbonate were disposed at opposite ends of the current collectors 3 so that the supports 5 cooperated with the gaskets 4 to. interpose therebetween the current collectors 3 at the opposite ends thereof. Then, epoxy resin was coated around the gaskets 4 and the supports 5 to hermetically seal the electrolytic solution. Then, terminal plates 6 composed of stainless steel were compressively secured to the current collectors 3. Further, a pair of fixation plates 7 composed of polycarbonate were disposed over the terminal plates 6. The fixation plates 7 had through holes at four corners thereof. The fixation plates 7 were fixated to each other by means of four pairs of bolts and nuts 8 inserting through the through holes. Thus, an electric double layer capacitor including a polarizable electrode in accordance with the invention was completed.

The two capacitors in accordance with the embodiment were charged at a constant voltage of 0.9 V for 1 hour. Then, each of the capacitors was discharged at a constant current of 0.1 ampere and 10 amperes until the voltage 0.9 V was reduced to 0.45 V. Here, $\Delta C$ is defined to be a difference subtracting a capacitance of the capacitor at a discharging current of 10 A from a capacitance $C_{O.1A}$ of the capacitor at a discharging current of 0.1 A. A capacitance variation ratio $\Delta C/C_{0.1A}$ of each of the capacitors are shown in Table 1.

As is obvious from Table 1, with the increase of a specific surface area of activated carbon powder as a raw material, the polarizable electrode in accordance with the embodiment has a smaller density, but has a larger micropores volume and BET specific surface area, resulting in the decrease of the capacitance variation ratio $\Delta C/C_{0.1A}$. Thus, the capacitance variation ratio was greatly improved. A polarizable electrode made from activated carbon powder having a specific surface area of 1200 $m^2/g$ had a quite tight structure, and hence induced a large capacitance variation ratio. As a result, it was found that a polarizable electrode suitable for a large amount of current discharge had micropores among which micropores having a diameter in the range of 0.1 to 5.0 micrometers occupy a volume equal to or greater than 0.1 $cm^3/g$, and also had a specific surface area equal to or grater than 1000$m^2/g$. It was also found that activated carbon of which a polarizable electrode suitable for a large amount of current discharge is to be made preferably has a specific surface area equal to or greater than 1600 $m^2/g$, more preferably 2000 $m^2/g$.

[Embodiment 2]

First, there was prepared a mixture including phenol family activated carbon powder having a specific surface area of 1500 $m^2/g$, and phenol resin powder commercially available from Kanebo Inc., Ltd. by the tradename of Bellpearl S type. A mixture ratio by weight of the former and the latter is 7:3. The mixture was sufficiently dry mixed with a ball mill. Then, 10 grams of the mixture was molded with a metal mold at 60, 80, 100, 120 and 140 degrees centigrade under 100 $kg/cm^2$ for 10 minutes to thereby form phenol resin plates each including activated carbon and having a size of 70×50 $mm^2$ and a thickness of 3 mm. Then, the phenol resin plates were thermally treated in the same way as that of the embodiment 1, to thereby fabricate activated carbon/carbon composite. Table 2 shows a density, BET specific surface area, and a volume of micropores having a diameter in the range of 0.1 to 5.0 micrometers. In this embodiment, there was also manufactured an electric double layer capacitor composed of the thus obtained activated carbon/carbon composite. The capacitor had the same structure as that of the embodiment 1. Then, a charge and discharge experiment was conducted in the same way as that of the embodiment 1. Table 2 shows a capacitor variation ratio obtained as the results of the experiment.

As is obvious from Table 2, the polarizable electrode in accordance with the embodiment 2 has a smaller density, but has a larger volume of micropores at a lower molding temperature, resulting in a great improvement of a capacitor variation ratio, more specifically, an decrease of a capacitor variation ratio. However, at a molding temperature of 60 degrees centigrade, the phenol resin was not cured, and hence the polarizable electrode could not maintain its shape. Thus, a polarizable electrode is required to have a density equal to or greater than 0.5 grams per cubic centimeter. On the other hand, at a molding temperature of 140 degrees centigrade, the phenol resin was completely cured and hence had a quite tight structure, resulting in a large capacitance variation ratio. As a result, a molding temperature for molding a polarizable electrode suitable for a large amount of current discharge is preferably between 80 and 120 degrees centigrade.

[Embodiment 3]

First, there was prepared five mixtures each including phenol family activated carbon powder having a specific surface area of 1500 $m^2/g$, and each of five phenol resins. A mixture ratio by weight of the former and the latter is 7:3. The mixture was sufficiently dry mixed with a ball mill. Each of the above mentioned five phenol resins is a mixture of heat-fusible and curable phenol resin powder commercially available from Kanebo Inc., Ltd. by the tradename of Bellpearl S type, and heat-nonfusible phenol resin commercially available from Kanebo Inc., Ltd. by the tradename of Bellpearl R type, in each of which a weight percent of the latter is 10, 15, 30, 60 and 80%. Then, 10 grams of each of the mixture was molded with a metal mold at 150 degrees centigrade under 100 $kg/cm^2$ for 10 minutes to thereby form phenol resin plates each including activated carbon and having a size of 70×50 $mm^2$ and a thickness of 3 mm. Then, the phenol resin plates were thermally treated in the same way as that of the embodiment 1, to thereby fabricate activated carbon/carbon composite. Table 3 shows a density, BET specific surface area, and a volume of micropores having a diameter in the range of 0.1 to 5.0 micrometers. In this embodiment, there was also manufactured an electric double layer capacitor composed of the thus obtained activated carbon/carbon composite. The capacitor had the same structure as that of the embodiment 1. Then, a charge and discharge experiment was conducted in the same way as that of the embodiment 1. Table 3 shows a capacitor variation ratio obtained as the results of the experiment.

As is obvious from Table 3, with the increase of content of heat-nonfusible phenol resin, the polarizable electrode in accordance with the embodiment 3 has a smaller density, but has a larger volume of micropores, resulting in a great improvement of a capacitor variation ratio, more specifically, an decrease of a capacitor variation ratio. However, the effects of the heat-nonfusible phenol resin did not appear at the content of the heat-nonfusible phenol resin of 10%. At the content of the resin of 80%, the polarizable electrode could not maintain its shape because an amount of the heat-fusible phenol resin was too small. As a result, it was found that a polarizable electrode suitable for a large amount of current discharge preferably includes heat-nonfusible resin in the range of 15 to 60% by weight on the basis of the total weight of raw material phenol resin.

[Embodiment 4]

First, there was prepared a mixture including phenol family activated carbon powder having a specific surface area of 1500 $m^2/g$, heat-fusible and curable phenol resin powder commercially available from Kanebo Inc., Ltd. by the tradename of Bellpearl S type, and PVA aqueous solution including polyvinyl alcohol (PVA) by 10% by weight. A mixture ratio by weight of the activated carbon powder and the phenol resin powder is 7:3. The mixture was sufficiently dried in an oven at 120 degrees centigrade. Then, the mixture was passed through a screen having a mesh of about 500 micrometers to thereby remove particles having a diameter larger than 500 micrometers. Then, 10 grams of the mixture was molded with a metal mold at 150 degrees centigrade under 100 kg/cm$^2$ for 10 minutes to thereby form phenol resin plates each including activated carbon and having a size of 70×50 mm$^2$ and a thickness of 3 mm. Then, the phenol resin plates were thermally treated in the same way as that of the embodiment 1, to thereby fabricate activated carbon/carbon composite. Table 4 shows a density, BET specific surface area, and a volume of micropores having a diameter in the range of 0.1 to 5.0 micrometers. In this embodiment, there was also manufactured an electric double layer capacitor composed of the thus obtained activated carbon/carbon composite. The capacitor had the same structure as that of the embodiment 1. Then, a charge and discharge experiment was conducted in the same way as that of the embodiment 1. Table 4 also shows a capacitor variation ratio obtained as the results of the experiment.

It was found from Table 4 that the polarizable electrode in accordance with the embodiment 4 was suitable for a large amount of current discharge because of micropores or cavities formed when PVA had been thermally decomposed. In addition, it was possible to avoid the powder from scattering in the manufacturing steps because of the use of PVA.

As having been explained by way of the preferred embodiments, micropores having a diameter of micrometers order are to be formed in the polarizable electrode in accordance with the invention, to thereby facilitate the movement of ions in the electrode. Thus, it is possible to accomplish a solid activated carbon electrode suitable for a larger amount of current supply.

In addition, it is possible to shorten a period of time for sintering an electrolytic solution into the electrode by virtue of the micropores formed by the invention.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

TABLE 1

| SPECIFIC SURFACE AREA OF ACTIVATED CARBON POWDER [m$^2$/g] | DENSITY [g/cm$^3$] | VOLUME OF MICROSPORES [cm$^3$/g] | BET SPECIFIC SURFACE AREA [m$^2$/g] | CAPACITANCE VARIATION RATIO [%] |
|---|---|---|---|---|
| 1200 | 1.1022 | 0.088 | 451 | −100 |
| 1600 | 0.9253 | 0.120 | 1263 | −48 |
| 2000 | 0.7203 | 0.570 | 1502 | −11 |
| 2400 | 0.5182 | 0.981 | 1764 | −6 |

TABLE 2

| MOLDING TEMPERATURE [°C.] | DENSITY [g/cm$^3$] | VOLUME OF MICROPORES [cm$^3$/g] | BET SPECIFIC SURFACE AREA [m$^2$/g] | CAPACITANCE VARIATION RATIO [%] |
|---|---|---|---|---|
| 60 | — | — | — | — |
| 80 | 0.5233 | 1.227 | 1289 | −9 |
| 100 | 0.7041 | 0.825 | 1250 | −25 |
| 120 | 0.8579 | 0.457 | 1266 | −35 |
| 140 | 0.9821 | 0.098 | 1240 | −64 |

TABLE 3

| HEAT-NONFUSIBLE PHENOL RESIN CONTENT [wt %] | DENSITY [g/cm$^3$] | VOLUME OF MICROPORES [cm$^3$/g] | BET SPECIFIC SURFACE AREA [m$^2$/g] | CAPACITANCE VARIATION RATIO [%] |
|---|---|---|---|---|
| 10 | 0.9700 | 0.097 | 1220 | −61 |
| 15 | 0.8827 | 0.399 | 1255 | −43 |
| 30 | 0.7211 | 0.505 | 1264 | −27 |
| 60 | 0.6325 | 0.823 | 1283 | −11 |
| 80 | — | — | — | — |

TABLE 4

| ACTIVATED CARBON/ PHENOL RESIN/PVA | DENSITY [g/cm$^3$] | VOLUME OF MICROPORES [cm$^3$/g] | BET SPECIFIC SURFACE AREA [m$^2$/g] | CAPACITANCE VARIATION RATIO [%] |
|---|---|---|---|---|
| 70/30/10 | 0.6537 | 0.875 | 1271 | −13 |

What is claimed is:

1. A polarizable electrode for use in an electric double layer capacitor composed of activated carbon/carbon composite having micropores, those among said micropores having diameters ranging from about 0.1 to 5.0 micrometers have a volume ranging from about 0.1 to 1.2 cm$^3$/g, said composite further having a specific surface area equal to or greater than about 1000 m$^2$/g and a density ranging from about 0.5 to 0.93 g/cm$^3$, and having a capacitance variation ratio greater than about −50% and said composite being composed of a mixture which is thermally treated in a non-oxidizing atmosphere, said mixture being prepared by mixing activated carbon powder and heat-fusible and curable phenol resin with heat-nonfusible phenol resin ranging from about 15 to 60 percent by weight on a basis of the weight of said heat-fusible and curable phenol resin.

2. The polarizable electrode as recited in claim 1, wherein said activated carbon powder has a specific surface area equal to or greater than 1600 m$^2$/g.

3. The polarizable electrode as recited in claim 2, wherein said activated carbon powder has a specific surface area equal to or greater than 2000 m$^2$/g.

4. The polarizable electrode as recited in claim 1, wherein said non-oxidizing atmosphere is a nitrogen atmosphere.

5. The polarizable electrode as recited in claim 1, wherein said mixture is thermally treated in an electric furnace.

* * * * *